United States Patent [19]

Vasta

[11] Patent Number: 4,572,870
[45] Date of Patent: Feb. 25, 1986

[54] CHLOROSULFONATED ETHYLENE VINYL ACETATE POLYMER COATING COMPOSITION

[75] Inventor: Joseph A. Vasta, Wilmington, Del.

[73] Assignee: E. I. Du Pont de Nemours and Company, Wilmington, Del.

[21] Appl. No.: 687,364

[22] Filed: Dec. 28, 1984

Related U.S. Application Data

[63] Continuation-in-part of Ser. No. 639,081, Aug. 9, 1984, abandoned.

[51] Int. Cl.$^4$ .................. C08L 23/34; C08L 63/02; C08L 63/04
[52] U.S. Cl. .................. 428/416; 523/400; 523/435; 523/454; 523/456; 523/455; 523/457; 523/468; 525/113; 428/418; 428/421; 428/463
[58] Field of Search ............ 523/435, 454, 455, 456, 523/457, 468, 434; 525/113; 428/416, 421, 463, 413

[56] References Cited

U.S. PATENT DOCUMENTS

| | | | |
|---|---|---|---|
| 3,600,469 | 8/1971 | Sato et al. | 260/897 C |
| 3,891,606 | 6/1975 | Kogon | 260/77.5 |
| 3,899,438 | 8/1975 | Kalil | 252/182 |
| 4,244,807 | 1/1981 | Serafini et al. | 523/468 |
| 4,379,885 | 4/1983 | Miller et al. | 523/435 |
| 4,417,006 | 11/1983 | Graziana et al. | 523/435 |
| 4,424,353 | 1/1984 | Meyer et al. | 544/253 |
| 4,427,802 | 1/1984 | Moulton et al. | 523/468 |
| 4,487,878 | 12/1984 | Vasta | 524/413 |
| 4,490,501 | 12/1984 | Vasta | 524/413 |
| 4,495,247 | 1/1985 | Vasta | 428/422 |
| 4,495,248 | 1/1985 | Vasta | 428/422 |
| 4,503,174 | 3/1985 | Vasta | 525/113 |

OTHER PUBLICATIONS

Florad ® Coating Additives; Technical Bulletin—Commercial Chemicals Division; 3M Company.
Chlorosulfonated Polyethylene—A New Binder for Use in Paints; 1958, Kelly et al.; Reprint—Federation of Paint & Varnish Prd. Clubs Digest.
Coatings of Hypalon ® 20 Synthetic Rubber; Roche; Elastomers Div., Du Pont Co., 1956.

*Primary Examiner*—Allan M. Lieberman
*Attorney, Agent, or Firm*—Hilmar L. Fricke

[57] ABSTRACT

A coating composition containing 10–80% by weight of binder and 20–90% by weight of an organic solvent in which the binder is
(1) a chlorosulfonated ethylene vinyl acetate polymer,
(2) an epoxy resin,
(3) a polyamine curing agent, and
(4) a bicyclic amidine.

The composition is used as a primer or topcoating for metal substrates and curings at ambient temperatures and provides a finish that has excellent adhesion to the substrate and is tough, durable, weatherable and when pigmented with electrically conductive pigments, can be used as a coating for electrodes used in electrochemical reactions such as grids used in lead acid storage batteries.

23 Claims, No Drawings

CHLOROSULFONATED ETHYLENE VINYL ACETATE POLYMER COATING COMPOSITION

CROSS REFERENCE TO RELATED APPLICATIONS

This application is a continuation-in-part of Ser. No. 639,081 filed Aug. 9, 1984 and now abandoned.

BACKGROUND OF THE INVENTION

This invention is related to a coating composition and in particular to a chlorosulfonated ethylene vinyl acetate polymer coating composition that cures at ambient temperatures.

Chlorosulfonated ethylene vinyl acetate polymers are inert to strong acids and strong bases and are resistant to weathering and salt water corrosion and are tough and abrasion resistant. Coatings of these polymers are extremely useful for protecting metal substrates exposed to chemicals and weathering. Typically, these coating would be useful in chemical plants and oil refineries to coat pipes, vessels, storage tanks, and other equipment and useful to coat offshore oil well platforms, barges, and ships. Also these coatings in combination with fluorocarbon polymer coatings would form a protective coating for the interior of smoke stacks of utility companies. However, conventional coatings formed with chlorosulfonated ethylene vinyl acetate polymers either require curing at elevated temperatures which is not possible with the aforementioned large structures or require a long time for curing such as one to two weeks during which time the coating can easily be damaged. A coating compositions is needed that will cure rapidly at ambient temperatures.

The coating composition of this invention is directed to a composition that cures rapidly at ambient temperatures, has excellent adhesion to a variety of substrates, is weatherable, and is corrosion and abrasion resistant.

SUMMARY OF THE INVENTION

A coating composition containing 10-80% by weight of binder and 20-90% by weight of an organic solvent; wherein the binder is
(1) a chlorosulfonated ethylene vinyl acetate polymer containing about 10-30% by weight of polymerized vinyl acetate, having a melt index of about 350-10,000, containing about 40-48% by weight chlorine and up to 3% by weight sulfur present as combined sulfonyl chloride groups;
(2) an epoxy resin;
(3) a polyamine curing agent of the formula

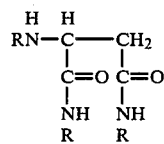

where R is $R^1NH$ and $R^1$ is an aliphatic or cycloaliphatic hydrocarbon radical; and
(4) a bicyclic amidine.

DETAILED DESCRIPTION OF THE INVENTION

The coating composition contains about 10-80% by weight binder and about 20-90% by weight organic solvent. The binder is a blend of a chlorosulfonated ethylene vinyl acetate polymer, an epoxy resin, a polyamine curing agent and a bicyclic amidine. One of the advantages of the composition is that it cures rapidly at ambient temperatures and baking is not required. Therefore, the composition can be used on large structures such as ships, barges, chemical storage tanks, chemical reactors and other typical large equipment used in refineries and chemical plants. These structures could not be subjected to baking temperatures using conventional techniques and therefore, conventional compositions that require baking cannot be used.

The chlorosulfonated ethylene vinyl acetate polymer contains 10-30% by weight, preferably about 16-26% by weight, of polymerized vinyl acetate. The polymer has a melt index of about 350-10,000, preferably 400-1000. The melt index is determined by ASTM D1234-65T, revised 1965 (condition E). The polymer contains about 40-48% by weight, preferably 42-46% by weight, chlorine. The polymer contains up to about 3% preferably 0.5-2% by weight sulfur as sulfonyl chloride.

The chlorosulfonated ethylene vinyl acetate copolymer can be prepared by reacting ethylene vinyl acetate copolymer with a chlorosulfonating agent at temperatures of about 80°-100° C. usually in the presence of a free radical initiator. A typical chlorosulfonating agent is sulfonyl chloride and a typical initiator is 2,2'-azobis-[2-methylpropane nitrile].

An epoxy resin that can be used in the composition has the formula

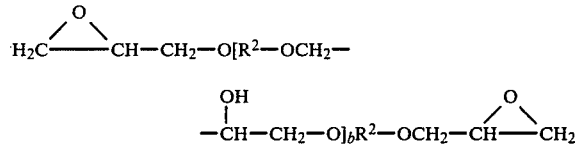

where b is a positive integer of about 0.5 to 4. Preferably, the epoxy resin is the polymerization product of epichlorohydrin and bisphenol A. In a preferred epoxy resin, R2 in the above formula is

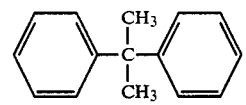

Typical of these preferred epoxy resins are "Epon" 828 having an equivalent weight of about 185–192 manufactured by Shell Chemical Company and DER 331 having an equivalent weight of about 182–190 manufactured by The Dow Chemical Company. The equivalent weight is the grams of resin that contain one gram equivalent of epoxide.

An epoxy novolac resin that can be used in the composition has the formula

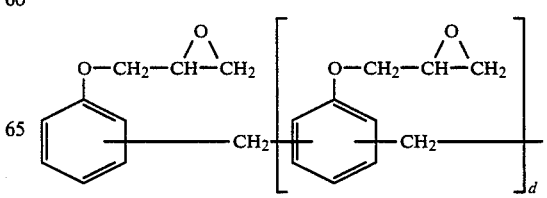

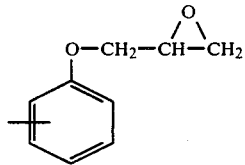

where d is a positive integer of about 0.2–2. Preferred epoxy novolac resins are DEN 431 where d has an average value of 0.2, DEN 438 where d has an average value of 1.6 and DEN 439 where d has an average value of 1.8. These resins are manufactured by the Dow Chemical Company.

The coating composition contains a polyamine curing agent of the formula

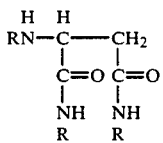

where R is $R^1NH$ and $R^1$ is an aliphatic or cycloaliphatic hydrocarbon radical. The aliphatic hydrocarbon radical can have 2–9 carbon atoms and the cycloaliphatic hydrocarbon radical can have 6–10 carbon atoms.

The curing agent is prepared by reacting 3 moles of an aliphatic or cycloaliphatic polyamine with 1 mole of a dialkyl maleate. Reaction temperatures of about 100°–150° C. are used for about 1–6 hours to form the curing agent while an alkanol resulting from the reaction is removed.

Typical polyamines used to form the curing agent are isophorone diamine which is 3-aminoethyl-3,5,5-trimethyl cyclohexylamine, hexamethylene diamine, ethylene diamine, 1,4-cyclohexane bis(methylamine), 1,2-diaminopropane, propylene diamine, diethyl ether diamine and trimethyl hexamethyl methylene diamine. Typical dialkyl maleates are dimethyl maleate, diethyl maleate, ethyl methyl maleate, dipropyl maleate, dibutyl maleate and the like.

One preferred curing agent is the reaction product of isophorone diamine and dimethyl maleate and has the following structural formula

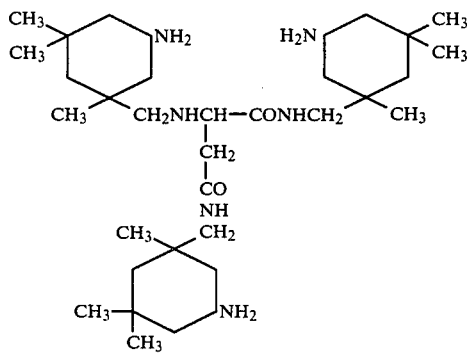

A polyamine curing agent of the following formula can be used also:

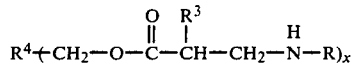

where R is defined above, $R^4$ is C or a hydrocarbon group, $R^3$ is H or $CH_3$; where x is 3 when $R^4$ is a hydrocarbon group and x is 4 when $R^4$ is C.

This curing agent is prepared through a Michael's reaction in which a multifunctional acrylate or methacrylate is reacted with a polyamine. In the preparation of the curing agent the polyamine is heated to about 100°–150° C. and then the multifunctional acrylate or methacrylate is reacted with the amine for a 1–6 hour period to form a polyamine curing agent.

Typical multifunctional acrylates or methacrylates that can be used to form the curing agent are trimethylol propane acrylate, trimethylol propane methacrylate, trimethylol butane methacrylate or acrylate, pentaerythritol acrylate, pentaerythritol methacrylate and the like. Typically $R^4$ is either C or a hydrocarbon group having 2–4 carbon atoms.

The above polyamines are used to form this curing agent. Isophorone diamine is preferred.

Preferred polyamine curing agents are the reaction product of the following: isophorone diamine and trimethylol propane acrylate; isophorone diamine and pentaerythritol acrylate; hexamethylene diamine and trimethylol propane acrylate; and hexamethylene diamine and pentaerythritol acrylate.

To decrease curing time and increase toughness of finishes of the composition, a bicyclic amidine is used in the composition. The bicyclic amidine significantly extends the "pot life" of the composition after all of the constituents of the composition are mixed together.

The composition contains about 0.1–3% by weight, based on the weight of the binder, of the bicyclic amidine. Preferably, the composition contains about 0.2–3% by weight, based on the weight of the binder, of the bicyclic amidine. One preferred bicyclic amidine is 1,8-diaza-bicyclo(5,4,0)-undecene-7.

In the place of the bicyclic amidine, about 0.1–3% by weight, based on the weight of the binder, of a strong organic base can be used. Typically useful bases are tertiary alkyl ammonium hydroxide such as tertiary ethyl, propyl or butyl ammonium hydroxide, tertiary alkyl ammonium methoxide such as tertiary, ethyl, propyl or butyl ammonium hydroxide.

About 1 to 4% by weight, based on the weight of the binder, of phenol can be added to the composition to decrease curing time and enhance toughness of the resulting finish.

Preferably, the binder of the coating composition contains 40–85% by weight of the chlorosulfonated ethylene vinyl acetate polymer, 9–44% by weight of epoxy resin, 3–20% by weight of the polyamine curing agent, and 0.1–3% by weight of bicyclic amidine.

About 0.5–5% by weight, based on the weight of the binder, of a chloride ion scavanger can be added to the composition. The metal ion of the scavanger reacts with any residual chlorides which may be on a substrate being painted thereby reducing corrosion of the substrate. For example, the steel on oil well platforms in the ocean is covered with a salt residue. If the salt on the surface of the steel is not bound in some manner, corrosion starts and rapidly accelerates.

Typical chloride ion scavengers that can be used are as follows: lead naphthenate which is preferred, lead tallate and lead octoate.

When the composition is applied over substrates that are moist or wet, about 0.1-3% by weight, based on the weight of the binder, of a silicone wetting agent is added to the composition to insure thorough wetting of the surface and penetration to the metal. Typical silicone wetting agents are as follows: oxyethylene methyl siloxanes such as "Silwet" L-77 and "Silwet" L-7607 made by Union Carbide and other condensation products of ethylene oxide and alkyl siloxane.

Generally, the composition is pigmented and contains pigments in a pigment to binder weight ratio of about 20:100 to 200:100. The pigments are dispersed in the composition by conventional techniques such as ball milling, sand grinding, attritor grinding and the like. Typical pigments that can be used are as follows: metallic oxides such as titanium dioxide, iron oxide, zinc oxide, chromate pigments such as lead chromate, filler pigments such as barytes, talc, china clay and the like, phosphate pigments such as zinc phosphate, zinc phospho oxide, carbon black, black molybdate oxide pigments, barium metaborate pigments and the like.

One particularly useful combination of pigments for a corrosion resistant primer is the following: titanium dioxide, barytes, talc, carbon black and zinc phospho oxide.

The composition generally is provided in two components. Component A contains chlorosulfonated ethylene vinyl acetate polymer, epoxy resin and pigments. Component B contains the polyamine curing agent and bicyclic amidine. The two components are blended together a relatively short time before application and the resulting composition is applied to a substrate.

Solvents used in the composition are chosen to provide curing at ambient temperatures and have a high evaporation rate at these temperatures. Typically useful solvents are as follows: alcohols such as methanol, ethanol, propanol, isopropanol, benzyl alcohol, acetates such as ethyl acetate and other solvent such as toluene, xylene, and the like.

The coating composition can be applied by conventional methods such as spraying, electrostatic spraying, brushing, dipping, flow coating and the like. The composition can be applied to a variety of substrates such as steel, iron, painted steel, treated steel such as phosphatized steel, aluminum, plastics, wood, glass and the like. The composition can be fully cured as demonstrated by resistance to solvents such as methyl ethyl ketone in about 24 to 48 hours. Higher curing temperatures reduce the curing time; for example, the finish can be heated to about 80°-120° C. for 0.5-2.0 hours for rapid curing. The resulting finish has excellent adhesion to the substrate, good corrosion resistance, is weatherable and durable and with proper pigmentation can be used as a primer or as a topcoat. The composition is particularly useful as an overcoat primer for steel substrates coated with an inorganic zinc primer.

One particularly chemical resistant and durable combination of finishes comprises a primer layer about 125 to 150 microns thick on a steel substrate of the cured composition of this invention and a top layer that is in superimposed adherence to this primer layer and is about 500 to 750 microns thick of a cured fluorocarbon polymer of vinylidene fluoride and hexafluoropropylene.

For some uses, the composition can be baked at elevated temperatures of about 40°-70° C. for about 15 minutes-3 hours. Typically, the composition can be used on small parts, small diameter pipes, relatively small vessels which can readily be placed into an oven and baked. It is possible to eliminate the bicyclic amidine if the composition is to be cured at elevated temperatures. The binder of such a coating composition contains about 35-90% by weight of the chlorosulfonated ethylene vinyl acetate polymer, 7-60% by weight of epoxy resin and 3-20% by weight of the polyamine curing agent.

Instead of the polyamine curing agent, a lead compound such as litharge or other lead oxides, or lead dioxide or lead salts like lead naphthenate, lead neodeconate, tribasic lead maleate can be used. However, the resulting coating preferably baked at 40°-70° C. for about 15 minutes-2 hours. The lead compound is used in about the same amounts in the coating composition as in the polyamine curing agent.

One particular use for the composition of this invention is to coat electrodes used in electrochemical reactions. One typical example is to coat grids used in lead acid storage batteries. The composition is resistant to strong acids such as sulfuric acid used in these batteries. Corrosion rate of the grids which are typically lead alloys of antimony or calcium can be reduced by one half to one third of uncoated grids.

There are a number of advantages to using coated grids in batteries in comparison to conventional batteries that typically do not use coated grids. The battery life can be increased from 2-3 times without changing the battery since corrosion failure of the grid is substantially reduced and is one of the reasons for battery failure. The power output of a battery can be increased without a change in battery size and weight since thinner grids can be used which will have the same life as the thicker and heavier grids that are currently used. Size and weight of a battery can be reduced and the battery life will be the same as conventional batteries since thinner and lighter coated grids are used.

Any coating compositions used to coat electrodes such as battery grids would have to be electrically conductive. The coating composition for this end use contains electrically conductive pigments in a pigment to binder weight ratio of about 50/100 to 300/100. A dry film about 1 mil thick of the composition should have an electrical resistance of about 1-50 ohms.

Typical conductive pigments that can be used are carbon black pigments such as furnace black and acetylene black and graphite. One preferred carbon black is Gulf acetylene black pigment. Preferably, a mixture of carbon black pigments and finely divided graphite is used. Transition metal oxides also are useful conductive pigments such as lead oxide, magnetite, titanium suboxide having the formula $tiO_x$ where x is less than 2, ruthenium oxide, mixtures of ruthenium oxide and titanium suboxide and the like.

Typically, the grids of lead acid storage batteries are made from antimony lead alloys or calcium lead alloys. Preferably, a coating of an aminosilane is applied first. Typically useful amino silanes are gamma amino propyl trimethoxysilane, gamma glycidoxy trimethoxy silane, N-(2-aminoethyl)-3-amino-propyl trimethoxysilane and 3[2(vinylbenzyl amino)ethyl amino]propyltrimethoxy silane. Then a conductive coating of the composition of this invention is applied to the grid by spray application and then the coated grid is baked at about 40°-70° C.

The resulting coating can be 10–200 microns thick but preferably is about 20–50 microns thick and has excellent electrical conductivity. Batteries made from these coated grids have the above advantages.

The following example illustrates the invention. All parts and percentages are on a weight basis unless otherwise indicated.

EXAMPLE 1

The following constituents were blended together and charged into a ball mill and ground until a uniform dispersion was formed:

| | Parts By Weight |
|---|---|
| Chlorosulfonated ethylene vinyl acetate polymer solution (25% solids in toluene solvent of a chlorosulfonated ethylene vinyl acetate polymer having a vinyl acetate content of 16–26% by weight, a melt index determined according to ASTM D1234-65T of 400–1000, a chlorine content of 42–46% by weight and a sulfur content of about 0.5–2% by weight as sulfonyl chloride) | 44.75 |
| D.E.R. 331 epoxy resin (liquid epoxy resin of bisphenol A and epichlorohydrin having an epoxide equivalent weight of about 182–190 and a viscosity measured at 25° C. of 11,000–14,000 cps) | 4.79 |
| Titanium dioxide pigment | 9.93 |
| Barium sulfate pigment | 7.61 |
| Talc | 11.68 |
| Ethyl acetate | 8.87 |
| Toluene | 6.08 |
| "Fluorad" FC 430 solution (2% solution in toluene of a nonionic fluorochemical surfactant) | 0.56 |
| Total | 94.27 |

Composition B was prepared by blending together the following constituents:

| | Parts By Weight |
|---|---|
| Polyamine curing agent solution (55% solids in isopropanol of the reaction product of 3 moles of isophorone diamine and dimethyl maleate) | 2.28 |
| Bicyclic amidine [1,8-diaza-bicyclo (5,4,0)undecene-7] | 0.16 |
| Isopropanol | 3.29 |
| Total | 5.73 |

Composition B was thoroughly blended with the pigment dispersion prepared above and reduced with toluene to a spray viscosity of about 25 seconds measured with a #2 Zahn cup to form Coating Composition 1. Coating Composition 1 was sprayed onto a grit blasted steel and aluminum panels. In each case thick films were applied by allowing flash drying between each pass on spray application. The coatings were allowed to dry at ambient temperatures and gave a tack free film about 125 microns thick in about 15 minutes. In about 24 hours, the coatings were resistant to methyl ethyl ketone. After 3–7 days, the coatings were fully cured and were resistant to solvents, acids and alkali and had excellent durability and weatherability.

A gray primer composition was prepared as follows:

| | Parts By Weight |
|---|---|
| Chlorosulfonated ethylene vinyl acetate polymer solution (described above) | 38.84 |
| Epoxy resin (described above) | 6.51 |
| Titanium dioxide pigment | 7.69 |
| Barium sulfate pigment | 6.06 |
| "Nalzin" 2 pigment (zinc phospho oxide pigment) | 7.69 |
| Talc | 9.23 |
| Carbon black pigment | 0.16 |
| Ethyl acetate | 8.51 |
| Toluene | 5.89 |
| "Fluorad" FC 430 solution (described above) | 0.56 |
| Total | 91.14 |

The above constituents were blended together and charged into a ball mill until a uniform gray dispersion was formed.

Composition C was prepared by blending together the following constituents:

| | Parts By Weight |
|---|---|
| Polyamine curing agent (described above) | 3.18 |
| Phenol | 0.53 |
| Bicyclic amidine (described above) | 0.18 |
| Benzyl alcohol | 0.18 |
| Isopropanol | 4.81 |
| Total | 8.88 |

Composition C was thoroughly blended with the above gray dispersion and the resulting primer composition was reduced to a spray viscosity with toluene and sprayed onto untreated steel panels. Solvent was allowed to flash off between passes and the primer was allowed to dry at ambient temperatures in about 15 minutes to form a primer coat about 100 microns thick.

The above prepared Coating Composition 1 was then sprayed onto aluminum panels primed with the above primer and allowed to flash dry between each pass of the spray gun and dried at ambient temperatures for about 20 minutes to provide a total topcoating thickness of about 250 microns. The coating has excellent resistance to corrosion by acids and alkali and excellent flexibility and weatherability.

EXAMPLE 2

The following constituents were blended together and charged into a ball mill and ground until a uniform dispersion was formed:

| | Parts by Weight |
|---|---|
| Chlorosulfonated ethylene vinyl acetate polymer solution (described in Example 1) | 98.7 |
| D.E.R. 331 Epoxy Resin (described in Example 1) | 42.4 |
| Toluene | 296.0 |
| Carbon black pigment (Gulf acetylene black) | 37.2 |
| Graphite 200-9 (finely divided graphite) | 111.7 |
| Ethyl acetate | 82.8 |
| Toluene | 331.2 |

-continued

|  | Parts by Weight |
|---|---|
| Total | 1000.0 |

Composition D was prepared by blending together the following constituents:

|  | Parts by Weight |
|---|---|
| Polyamine curing agent solution (described in Example 1) | 13.26 |
| Bicyclic amidine (described in Example 1) | 3.06 |
| Toluene/Ethylene Acetate (50/50 blend) | 172.00 |
| Total | 188.32 |

Composition D was thoroughly blended with 300 parts of the above pigment dispersion and reduced with toluene/ethyl acetate to a spray viscosity of about 25 seconds measured with a No. 2 Zahn cup to form a paint. A portion of the paint was sprayed onto a glass panel to 25 micron dry film thickness. The electrical resistance was measured and was about 5-7 ohms.

A calcium alloy lead grid and an antimony alloy lead grid used in storage batteries were first coated with a 2% solution of gamma amino propyl trimethoxy silane and dried and then sprayed with the above paint and baked at about 65° C. for about 1 hour. The resulting film was about 40 microns thick and had excellent adhesion to the lead substrate.

The coated grids were immersed in sulfuric acid solution and held at a 2.3 volt potential for 4 weeks. The coating did not blister or deteriourate and no corrosion of the substrate was noted. In comparison, uncoated lead grids exposed under the same conditions corroded severely.

Lead acid storage batteries made with the coated lead grids are expected to have a life of about 2-3 times that of batteries made with uncoated lead grids. Lead acid storage batteries can be made with grids that are ⅓-½ of the weight of conventional uncoated grids and can be expected to have a life equivalent to that of a conventional battery. Also, lead acid storage batteries can be made of the same size as conventional batteries but with substantially more power since the grids can be made thinner and more grids can be used in the battery; hence, increasing power of the battery.

I claim:
1. A coating composition comprising 10-80% by weight of binder and 20-90% by weight of an organic solvent; wherein the binder consists essentially of about
    (1) 40-85% by weight, based on the weight of the binder, of a chlorosulfonated ethylene vinyl acetate polymer having about 10-30% by weight of polymerized vinyl acetate, a melt index of about 350-10,000, containing about 40-48% by weight chlorine and up to 3% by weight sulfur present as combined sulfonyl chloride groups;
    (2) 9-44% by weight, based on the weight of the binder, of an epoxy resin selected from the group consisting of an epoxy resin having the formula

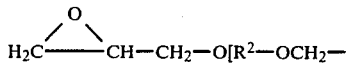

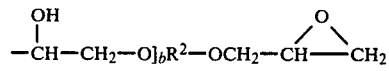

where $R^2$ is an aromatic radical and b is a positive integer of about 0.5 to 4, and an epoxy novolac resin of the formula

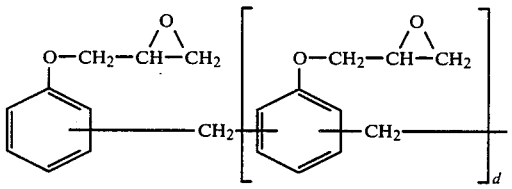

where d is a positive integer of about 0.2-2,
    (3) 3-20% by weight, based on the weight of the binder, of a polyamine curing agent of the formula

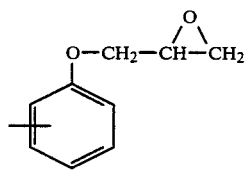

where R is $R^1NH_2$ and $R^1$ is an aliphatic or cycloaliphatic radical; and
    (4) 0.1-3% by weight, based on the weight of the binder, of a bicyclic amidine.

2. The coating composition of claim 1 containing pigment in a pigment-to-binder weight ratio of about 20:100 to 200:100.

3. The coating composition of claim 2 in which the chlorosulfonated ethylene vinyl acetate polymer contains about 16-26% by weight polymerized vinyl acetate, has a melt index of about 400-1000, contains about 42-46% by weight chlorine and about 0.5-2% by weight sulfur as sulfonyl chloride.

4. The coating composition of claim 3 in which $R^2$ is

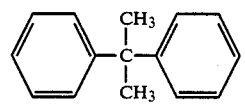

5. The coating composition of claim 3 in which R is

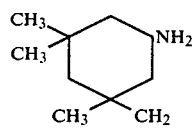

6. The coating composition of claim 3 in which the bicyclic amidine is 1,8-diaza-bicyclo(5,4,0)-undecene-7.

7. The coating composition of claim 3 containing about 0.1–3% by weight, based on the weight of the binder, of a fluorochemical surfactant.

8. The coating composition of claim 2 in which the binder consists essentially of about
   (1) 40–85% by weight, based on the weight of the binder, of a chlorosulfonated ethylene vinyl acetate polymer having about 16–26% by weight of polymerized vinyl acetate, a melt index of about 400–1000, containing about 42–46% by weight chlorine and about 0.5–2% by weight sulfur as sulfonyl chloride.
   (2) 9–44% by weight, based on the weight of the binder, of an epoxy resin of the formula

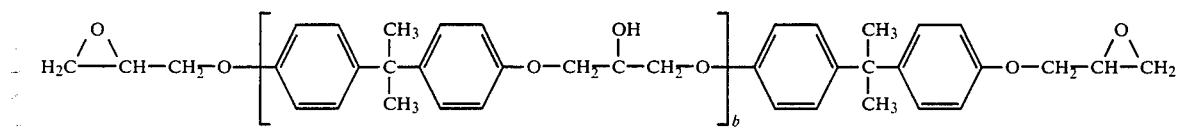

where b is a positive integer of about 0.5 to 4;
   (3) 3–20% by weight, based on the weight of the binder, of a polyamine curing agent of the formula

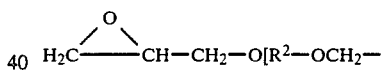

where R is

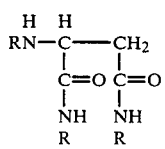

(4) 0.01–3% by weight of 1,8-diaza-bicyclo(5,4,0)undecene-7.

9. A two-component composition wherein the two components are mixed together to form the composition of claim 1 wherein the components comprise
   component (1) a solution of a chlorosulfonated ethylene vinyl acetate polymer having about 10–30% by weight of polymerized vinyl acetate, a melt index of about 350–10,000, containing about 40–48% by weight chlorine and up to 3% by weight sulfur present as combined sulfonyl chloride groups and an epoxy resin,
   component (2) a polyamine curing agent of the formula

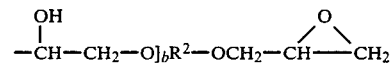

where R is $R^1NH$ and $R^1$ is an aliphatic or cycloaliphatic radical and a bicyclic amidine.

10. A coating composition comprising 10–80% by weight of binder and 20–90% by weight of an organic solvent; wherein the binder consists essentially of about
   (1) 35–90% by weight, based on the weight of the binder, of a chlorosulfonated ethylene vinyl acetate polymer having about 10–30% by weight of polymerized vinyl acetate, a melt index of about 350–10,000, containing about 40–48% by weight chlorine and up to 3% by weight sulfur present as combined sulfonyl chloride groups;
   (2) 7–60% by weight, based on the weight of the binder, of an epoxy resin selected from the group consisting of an epoxy resin having the formula

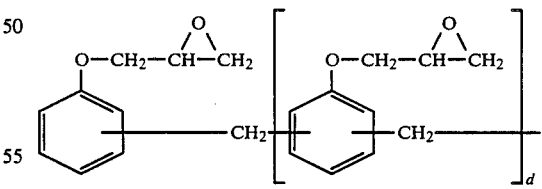

where $R^2$ is an aromatic radical and b is a positive integer of about 0.5 to 4 and an epoxy novolac resin having the formula

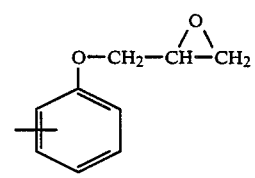

where d is a positive integer of about 0.2–2,
   (3) 3–20% by weight, based on the weight of the binder, of a polyamine curing agent selected from the group consisting of

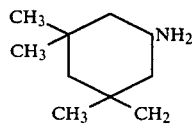

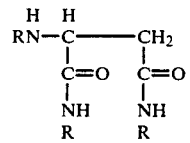

or

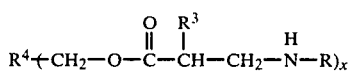

where R is $R^1NH_2$ and $R^1$ is an aliphatic or cycloaliphatic radical, $R^4$ is C or a hydrocarbon group, $R^3$ is H or $CH_3$, when x is 3, $R^4$ is a hydrocarbon group and when x is 4, $R^4$ is C.

11. The coating composition of claim 10 containing pigment in a pigment-to-binder weight ratio of about 20:100 to 200:100.

12. A coating composition comprising 10–80% by weight of binder and 20–90% by weight of an organic solvent; wherein the binder consists essentially of about (1) 35–90% by weight, based on the weight of the binder, of a chlorosulfonated ethylene vinyl acetate polymer having about 10–30% by weight of polymerized vinyl acetate, a melt index of about 350–10,000, containing about 40–48% by weight chlorine and up to 3% by weight sulfur present as combined sulfonyl chloride groups;

(2) 7–60% by weight, based on the weight of the binder, of an epoxy resin selected from the group consisting of an epoxy resin having the formula

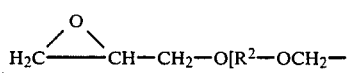

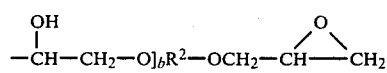

where $R^2$ is an aromatic radical and b is a positive integer of about 0.5 to 4 and an epoxy novolac resin of the formula

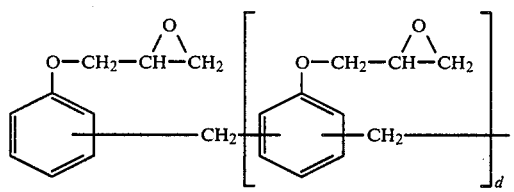

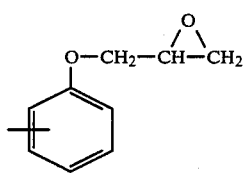

where d is a positive integer of about 0.2–2, (3) 3–20% by weight, based on the weight of the binder, of a polyamine curing agent selected from the group consisting of

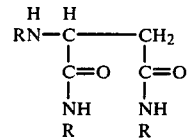

or

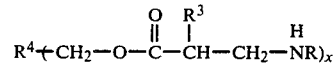

where R is $R^1NH_2$ and $R^1$ is an aliphatic or cycloaliphatic radical; $R^4$ is C or a hydrocarbon group, $R^3$ is H or $CH_3$, when x is 3, $R^4$ is a hydrocarbon group and when x is 4, $R^4$ is C and wherein the coating composition contains electrically conductive pigments in a pigment to binder weight ratio of about 50/100 to 300/100 and a dry film of the coating composition 25 microns thick has an electrical resistance of about 1–50 ohms.

13. The coating composition of claim 12 in which the conductive pigments are a mixture of carbon black pigment and finely divided graphite.

14. The coating composition of claim 13 in which the chlorosulfonated ethylene vinyl acetate polymer coatins about 16–26% by weight polymerized vinyl acetate, has a melt index of about 400–1000, contains about 42–46% by weight chlorine and about 0.5–2% by weight sulfur as sulfonyl chloride.

15. The coating composition of claim 12 which $R^2$ is

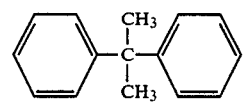

16. The coating composition of claim 15 in which R is

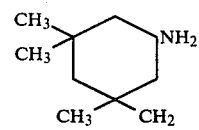

17. The coating composition of claim 12 containing in addition about 0.1–3% by weight, based on the weight of the binder of a bicyclic amidine.

18. The coating composition of claim 17 in which the bicyclic amidine is 1,8-diaza-bicyclo(5,4,0)-undecene-7.

19. The coating composition of claim 12 containing in addition about 0.1–3% by weight, based on the weight of the binder, of a strong organic base.

20. The coating composition of claim 19 in which the strong organic base is a tertiary alkyl ammonium hydroxide or a tertiary alkyl ammonium methoxide.

21. The coating composition of claim 17 in which the binder consists essentially of about (1) 40–85% by weight, based on the weight of the binder, of a chlorosulfonated ethylene vinyl acetate polymer having about 16–26% by weight of polymerized vinyl acetate, a melt index of about 400–1000, containing about 42–46% by weight chlorine and about 0.5-2% by weight sulfur as sulfonyl chloride.

(2) 9-44% by weight, based on the weight of the binder, of an epoxy resin of the formula

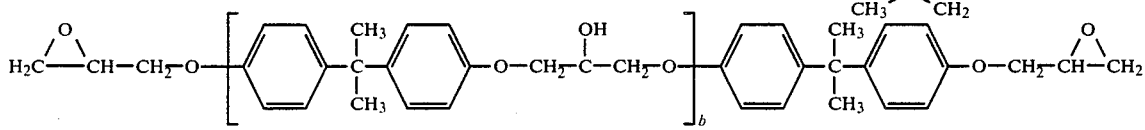

where b is a positive integer of about 0.5 to 4;

(3) 3-20% by weight, based on the weight of the binder, of a polyamine curing agent of the formula

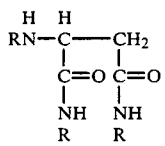

where R is

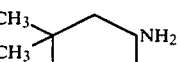

(4) 0.01-3% by weight of 1,8-diaza-bicyclo(5,4,0)undecene-7 and wherein the electrically conductive pigments comprise a mixture of carbon black pigment and finely divided graphite and a dry film of the coating has an electrical resistance of 5-20 ohms.

22. A substrate coated with a cured layer of the composition of claim 1.

23. A metal substrate coated with a cured primer layer of the composition of claim 2 and having in superimposed adherence to the primer layer a cured layer of a fluorocarbon polymer comprising vinylidene fluoride and hexafluoropropylene.

* * * * *